United States Patent
Takahara et al.

(10) Patent No.: US 10,027,422 B2
(45) Date of Patent: Jul. 17, 2018

(54) OPTICAL SIGNAL RECEIVING DEVICE AND METHOD OF RECEIVING AN OPTICAL SIGNAL

(71) Applicant: FUJITSU LIMITED, Kawasaki-shi, Kanagawa (JP)

(72) Inventors: Tomoo Takahara, Kawasaki (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/497,891

(22) Filed: Apr. 26, 2017

(65) Prior Publication Data

US 2017/0338892 A1    Nov. 23, 2017

(30) Foreign Application Priority Data

May 20, 2016   (JP) .................. 2016-101143

(51) Int. Cl.
    *H04B 10/60*    (2013.01)
(52) U.S. Cl.
    CPC .................. *H04B 10/60* (2013.01)
(58) Field of Classification Search
    CPC ...... H04B 10/695; H04B 10/69; H04B 10/66; H04B 10/60; H04B 10/6911
    See application file for complete search history.

(56) References Cited

U.S. PATENT DOCUMENTS

| 2007/0285239 | A1* | 12/2007 | Easton | G06K 7/0008 340/572.1 |
| 2010/0098411 | A1* | 4/2010 | Nakashima | H04B 10/60 398/25 |
| 2010/0135663 | A1* | 6/2010 | Nakashima | H04B 10/299 398/79 |
| 2014/0099130 | A1* | 4/2014 | Noheji | H04B 10/6161 398/208 |

FOREIGN PATENT DOCUMENTS

| JP | 2007-336078 | 12/2007 |
| JP | 2008-167126 | 7/2008 |

* cited by examiner

*Primary Examiner* — Ted Wang
(74) *Attorney, Agent, or Firm* — Fujitsu Patent Center

(57) ABSTRACT

An optical signal receiving device includes a receiver configured to receive an optical signal on which modulation has been performed by an optical signal transmission device, a convertor configured to convert the optical signal received by the receiver to a digital signal by sampling an intensity of the optical signal, and a processor coupled to the converter and configured to determine, based on a frequency distribution of the intensity of the optical signal indicated by the digital signal converted by the converter, a modulation scheme of the modulation performed by the optical signal transmission device.

16 Claims, 16 Drawing Sheets

OPTICAL SIGNAL RECEIVING DEVICE AND METHOD OF RECEIVING AN OPTICAL SIGNAL

CROSS-REFERENCE TO RELATED APPLICATION

This application is based upon and claims the benefit of priority of the prior Japanese Patent Application No. 2016-101143, filed on May 20, 2016, the entire contents of which are incorporated herein by reference.

FIELD

The embodiment discussed herein is related to an optical signal receiving device and a method of receiving an optical signal.

BACKGROUND

A conventional technique of identifying whether or not a modulated wave is a multicarrier wave based on a baseband signal extracted from the modulated wave is known. Further, a technique of changing a transmission capacity in accordance with transmission characteristics of an optical transmission path without changing a transceiver circuit is known.

Further, in recent years, modulation schemes such as Orthogonal Frequency Division Multiplexing (OFDM), for example, Discrete Multi-Tone modulation (DMT), Pulse Amplitude Modulation (PAM), and the like have been studied. Examples of the related art are Japanese Laid-open Patent Publication No. 2007-336078 and Japanese Laid-open Patent Publication No. 2008-167126.

SUMMARY

According to an aspect of the invention, an optical signal receiving device includes a receiver configured to receive an optical signal on which modulation has been performed by an optical signal transmission device, a convertor configured to convert the optical signal received by the receiver to a digital signal by sampling an intensity of the optical signal, and a processor coupled to the converter and configured to determine, based on a frequency distribution of the intensity of the optical signal indicated by the digital signal converted by the converter, a modulation scheme of the modulation performed by the optical signal transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the related arts described above, when optical signals with modulation schemes such as OFDM modulation, PAM, or the like are used, there is a problem of the receiving side being unable to determine the modulation scheme of an optical signal.

An embodiment of an optical receiving device and a determination method according to the disclosure will be described in detail below with reference to the drawings.

Embodiment

Optical Receiving Device and Receiving Circuit According to the Embodiment

Figure 1:
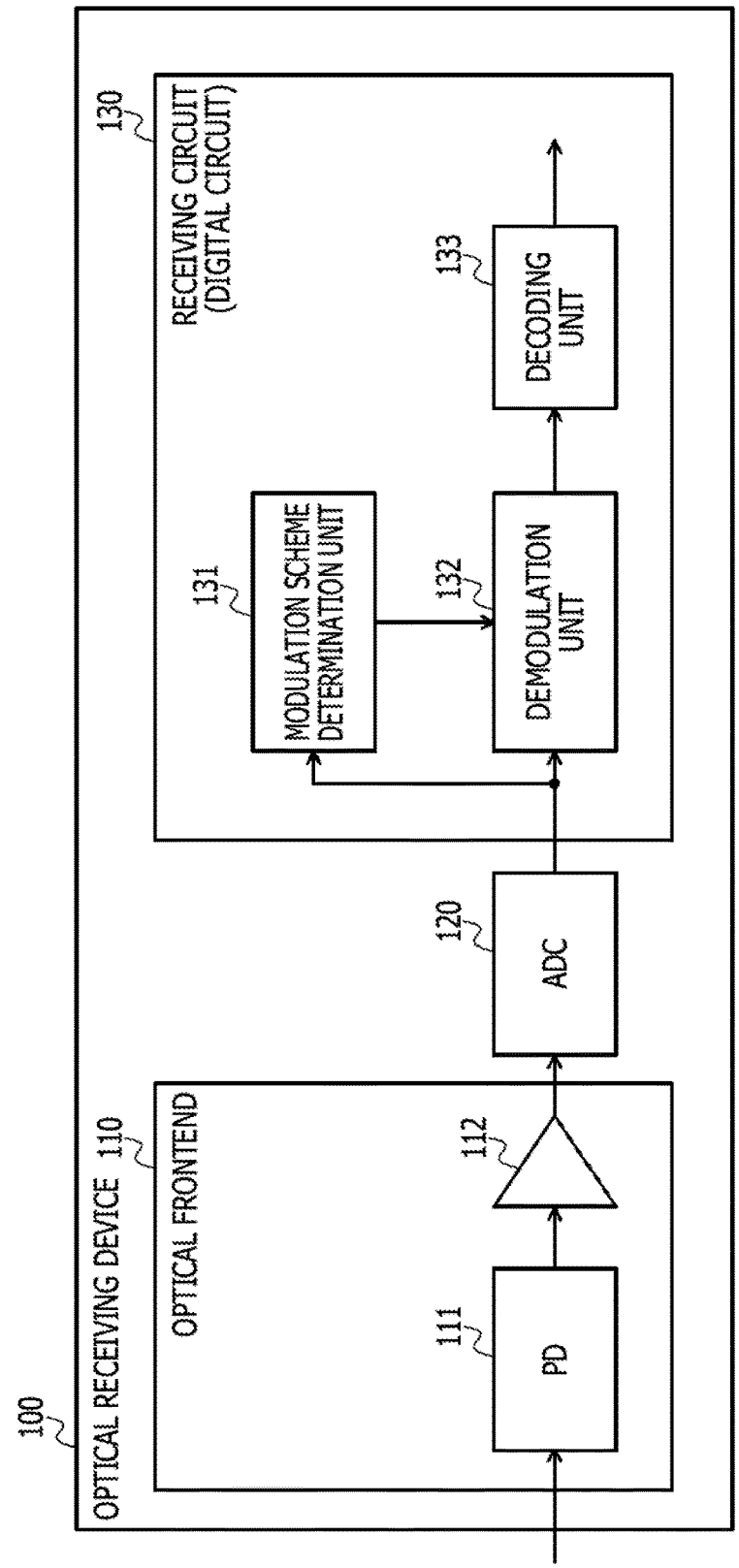
FIG. 1 is a diagram illustrating an example of an optical receiving device and a receiving circuit according to an embodiment.

FIG. 1 is a diagram illustrating an example of an optical receiving device and a receiving circuit according to the embodiment. As illustrated in FIG. 1, an optical receiving device 100 according to the embodiment has an optical frontend 110, an analog-to-digital converter (ADC) 120, and a receiving circuit 130.

The optical receiving device 100 receives an optical signal transmitted via an optical transmission path from an opposing optical transmission device. An optical signal received by the optical receiving device 100 is, for example, an optical signal that is intensity modulated. For example, an optical signal received by the optical receiving device 100 is any one of a plurality of modulation schemes including OFDM modulation and PAM.

For example, DMT is included in OFDM modulation. Non-Return-to-Zero (NRZ) is included in PAM, and binary modulation PAM-2, four-level modulation PAM-4, eight-level modulation PAM-8, 16-level modulation PAM-16, and so on are included in PAM. PAM-2 is a modulation scheme equivalent to NRZ.

The optical frontend 110 is an integrated optical frontend that receives, by using a direct detection scheme, an optical signal transmitted via an optical path from an optical transmission device. The direct detection scheme is a scheme that converts the light intensity of an optical signal to a signal, for example. For example, the optical frontend 110 has a photo detector (PD) 111 and an amplifier 112.

The PD 111 receives an optical signal transmitted via an optical transmission path from an optical transmission device opposing the optical receiving device 100 and outputs to the amplifier 112 a signal (an electrical signal) obtained by light reception.

The amplifier 112 amplifies a signal output from the PD 111 and outputs the amplified signal to the ADC 120. For example, a linear amplifier that linearly amplifies signal intensity can be used as the amplifier 112. Thereby, even when a signal is amplified by the amplifier 112, an intensity distribution, described later, can be obtained in the post-stage receiving circuit 130.

The ADC 120 samples the potential of a signal output from the optical frontend 110 and converts an analog signal to a digital signal. The ADC 120 then outputs the converted digital signal to the receiving circuit 130.

The receiving circuit 130 demodulates and decodes a signal output from the ADC 120. For example, the receiving circuit 130 can be implemented using a digital circuit such as a digital signal processor (DSP). Further, the receiving circuit 130 has a modulation scheme determination unit 131, a demodulation unit 132, and a decoding unit 133, for example.

The modulation scheme determination unit 131 determines the modulation scheme of a signal output from the ADC 120 based on a frequency distribution of the intensity (potential) indicated by a signal output from the ADC 120. That is, the modulation scheme determination unit 131 determines the modulation scheme of an optical signal received by the optical receiving device 100. The modulation scheme determination unit 131 then notifies the demodulation unit 132 of the determined modulation scheme.

For example, the modulation scheme determination unit 131 calculates the number of peaks in the frequency distribution of the intensity (for example, maximum frequency values) indicated by a signal output from the ADC 120 and, based on the calculated number of peaks, determines the modulation scheme of an optical signal received by the optical receiving device 100. The frequency distribution of the intensity of a signal output from the ADC 120 can be calculated by counting the signal output from the ADC 120 on an intensity basis over a predetermined time period, for example. The number of peaks in a frequency distribution can be calculated by using an approximation technique such as a least-squares method to generate an approximation curve of the frequency distribution, for example. Alternatively, the number of peaks in the frequency distribution can be calculated by counting the number of intensity peaks whose frequency exceeds a predetermined number, for example.

The demodulation unit 132 demodulates a signal output from the ADC 120 based on the modulation scheme notified by the modulation scheme determination unit 131. For example, the demodulation unit 132 demodulates a signal output from the ADC 120 by using a demodulation scheme consisting of an algorithm corresponding to the modulation scheme notified by the modulation scheme determination unit 131. The demodulation unit 132 outputs the demodulated signal to the decoding unit 133.

The decoding unit 133 decodes a signal output from the demodulation unit 132. The decoding unit 133 then outputs the decoded signal. For example, forward error correction (FEC) may be included in the decoding performed by the decoding unit 133.

A receiving unit that receives an optical signal by using a direct detection scheme can be implemented with the optical frontend 110, for example. A conversion unit that samples the intensity of the signal and converts a signal received by the receiving unit to a digital signal can be implemented using the ADC 120, for example. A determination unit that determines the modulation scheme of an optical signal based on the frequency distribution of the intensity indicated by the digital signal converted by the conversion unit can be implemented using the modulation scheme determination unit 131, for example. A demodulation unit that demodulates a digital signal based on the modulation scheme determined by the determination unit can be implemented using the modulation unit 132, for example.

Process by Modulation Scheme Determination Unit According to the Embodiment

Figure 2:
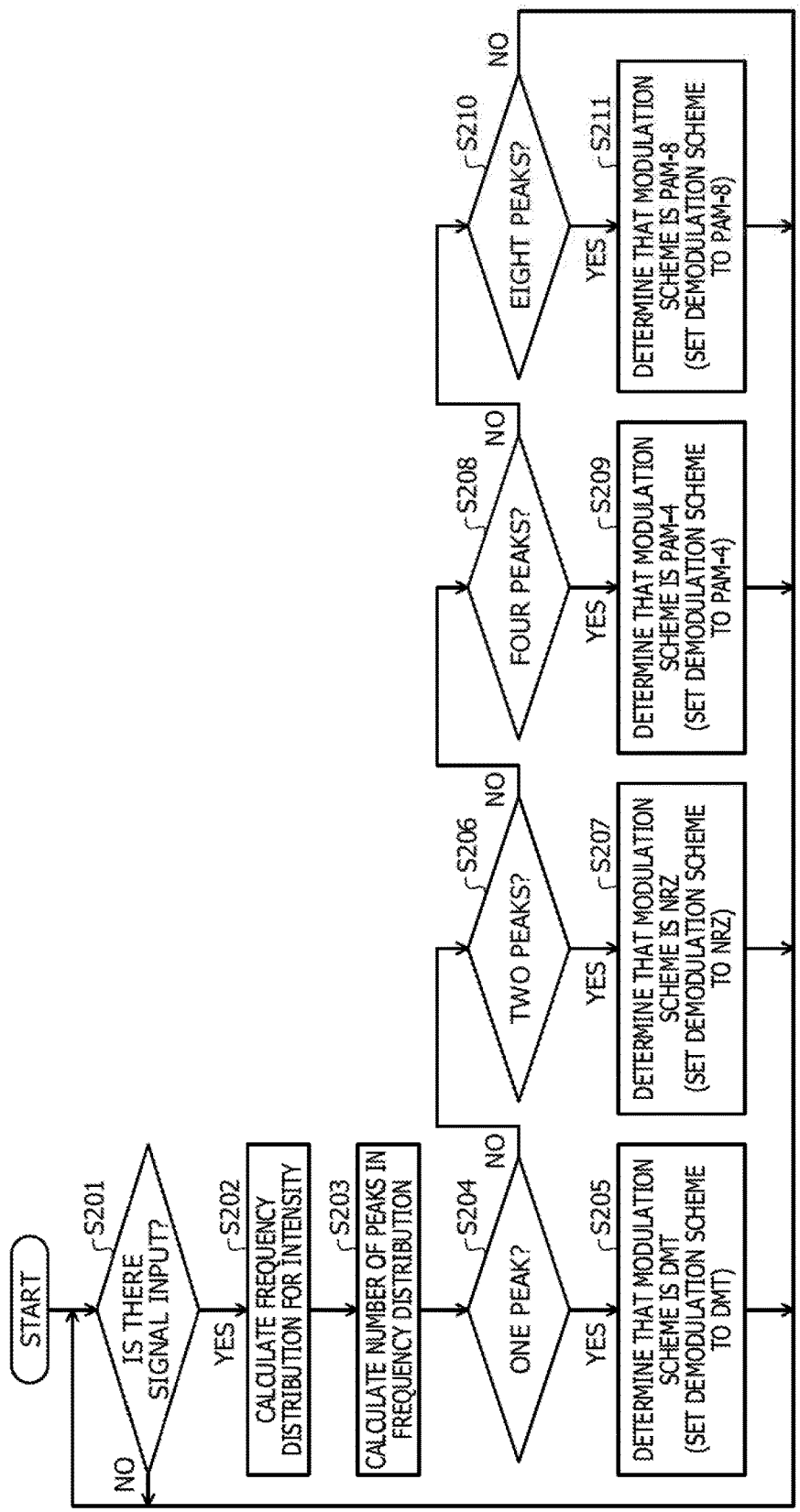
FIG. 2 is a flowchart illustrating an example of a process performed by a modulation scheme determination unit according to the embodiment.

FIG. 2 is a flowchart illustrating an example of a process performed by the modulation scheme determination unit 131 according to the embodiment. In the example illustrated in FIG. 2, the modulation scheme of an optical signal received by the optical receiving device 100 includes four modulation schemes of DMT, NRZ (PAM-2), PAM-4, and PAM-8. In this case, the modulation scheme determination unit 131 according to the embodiment performs respective steps illustrated in FIG. 2, for example. First, the modulation scheme determination unit 131 determines whether or not there is an input of a signal from the ADC 120 (step S201) or waits until a signal is input from the ADC 120 (step S201: a loop of No).

In step S201, if there is an input of a signal from the ADC 120 (step S201: Yes), the modulation scheme determination unit 131 calculates a frequency distribution for the intensity of a signal from the ADC 120 (step S202). In step S202, the modulation scheme determination unit 131 can calculate the frequency distribution by counting a signal from the ADC 120 on an intensity basis over a predetermined time period, for example. Next, the modulation scheme determination unit 131 calculates the number of peaks in the frequency distribution calculated in step S202 (step S203).

Next, the modulation scheme determination unit 131 determines whether or not the number of peaks calculated in step S203 is one (step S204). If the number of peaks is one (step S204: Yes), the modulation scheme determination unit 131 determines that the modulation scheme of the input signal is DMT (step S205), and the process returns to step S201. In this case, the demodulation unit 132 sets the demodulation scheme used for demodulation of the signal to a demodulation scheme corresponding to DMT.

In step S204, if the number of peaks is not one (step S204: No), the modulation scheme determination unit 131 determines whether or not the number of peaks calculated in step S203 is two (step S206). If the number of peaks is two (step S206: Yes), the modulation scheme determination unit 131 determines that the modulation scheme of the input signal is NRZ (PAM-2) (step S207), and the process returns to step S201. In this case, the demodulation unit 132 sets the demodulation scheme used for demodulation of the signal to a demodulation scheme corresponding to NRZ (PAM-2).

In step S206, if the number of peaks is not two (step S206: No), the modulation scheme determination unit 131 determines whether or not the number of peaks calculated in step S203 is four (step S208). If the number of peaks is four (step S208: Yes), the modulation scheme determination unit 131 determines that the modulation scheme of the input signal is PAM-4 (step S209), and the process returns to step S201. In this case, the demodulation unit 132 sets the demodulation scheme used for demodulation of the signal to a demodulation scheme corresponding to PAM-4.

In step S208, if the number of peaks is not four (step S208: No), the modulation scheme determination unit 131 determines whether or not the number of peaks calculated in step S203 is eight (step S210). If the number of peaks is eight (step S210: Yes), the modulation scheme determination unit 131 determines that the modulation scheme of the input signal is PAM-8 (step S211), and the process returns to step S201. In this case, the demodulation unit 132 sets the demodulation scheme used for demodulation of the signal to a demodulation scheme corresponding to PAM-8.

In step S210, if the number of peaks is not eight (step S210: No), it is determined that the modulation scheme is unable to be determined because startup of the optical transmission device opposing the optical receiving device 100 is not complete, for example. In this case, the modulation scheme determination unit 131 performs determination of the modulation scheme again by returning to step S201, for example. Thereby, the modulation scheme can be determined after the startup of the optical transmission device opposing the optical receiving device 100 has been completed, for example.

As illustrated in FIG. 2, the modulation scheme determination unit 131 can determine the modulation scheme of an optical signal based on the frequency distribution indicated by a digital signal obtained by the ADC 120. Further, by repeatedly performing determination of the modulation scheme and setting of the demodulation scheme based on the determination result, the optical receiving device 100 realizes a plug and play operation that automatically determines the modulation scheme of an optical signal and demodulates the optical signal.

Waveform of Optical Signal Received by Optical Receiving Device According to the Embodiment FIG. 3 to FIG. 6 are diagrams illustrating examples of optical signals received by the optical receiving device 100 according to the embodiment. In FIG. 3 to FIG. 6, the horizontal axis denotes time [ns] and the vertical axis denotes power [AU] of an electrical signal. The waveform 301 illustrated in FIG. 3 denotes a waveform in the optical receiving device 100 of an optical signal for which the modulation scheme is DMT.

Figure 4:
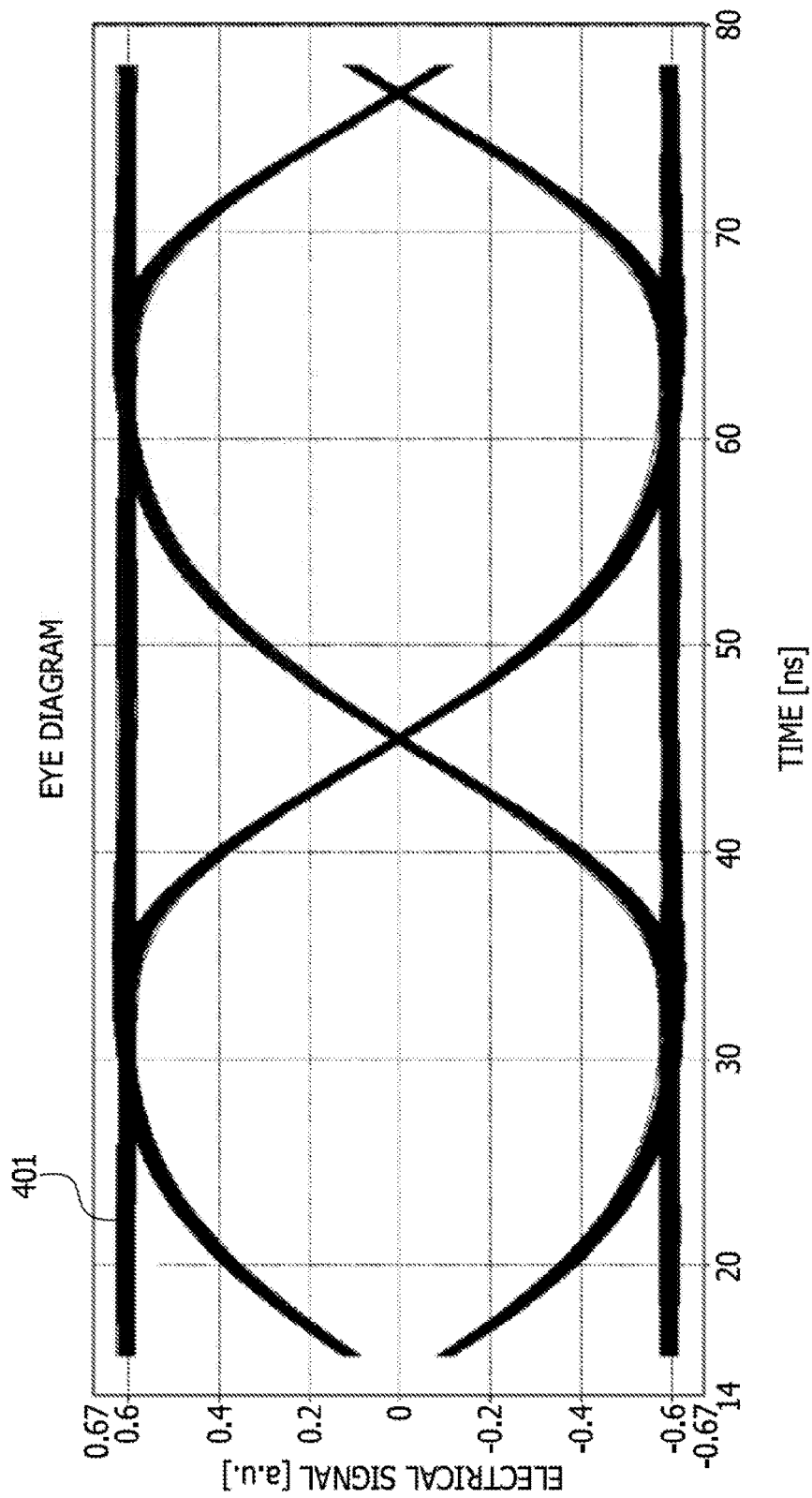
FIG. 4 is a diagram (part 2) illustrating an example of an optical signal received by the optical receiving device according to the embodiment.
Figure 5:
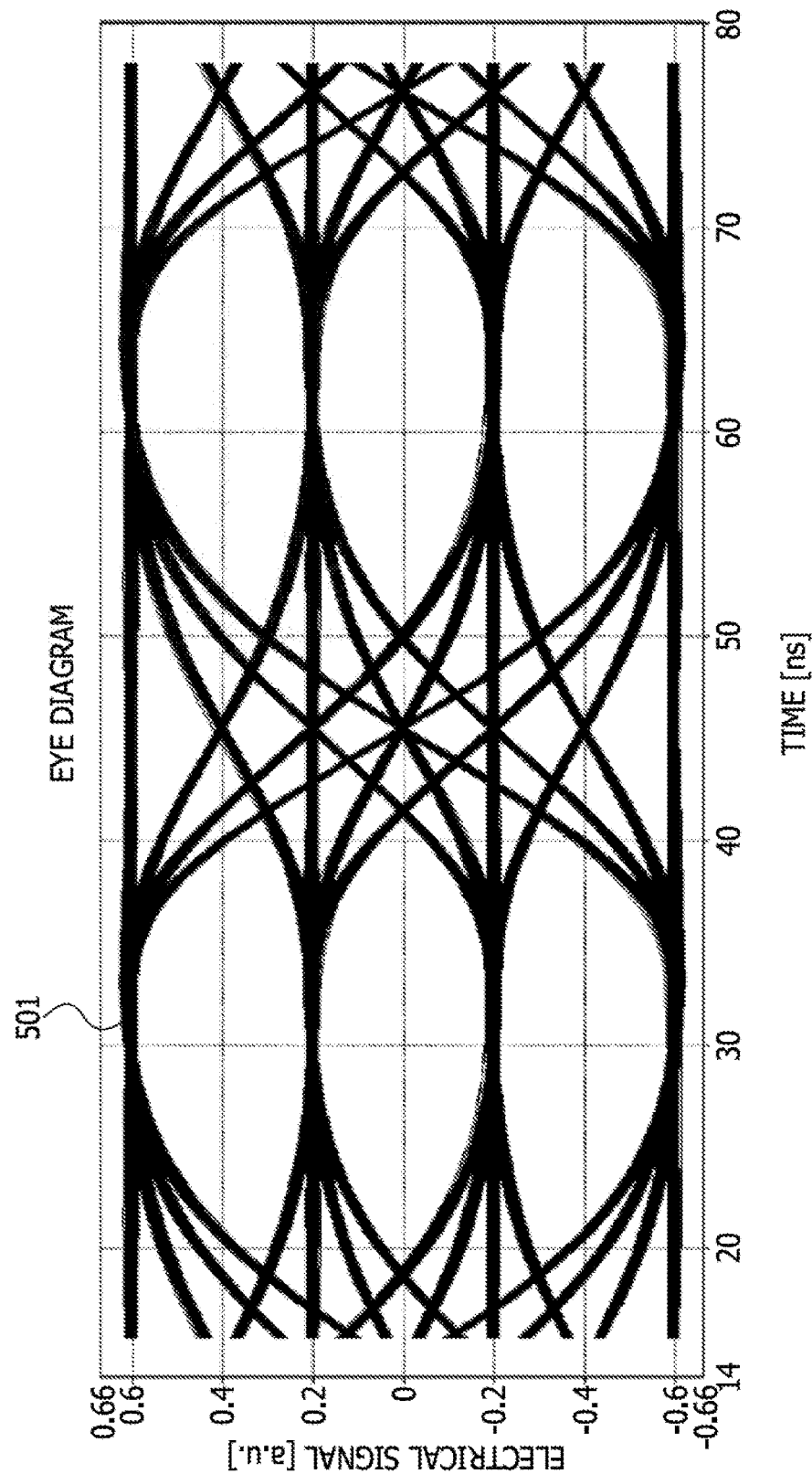
FIG. 5 is a diagram (part 3) illustrating an example of an optical signal received by the optical receiving device according to the embodiment.
Figure 6:
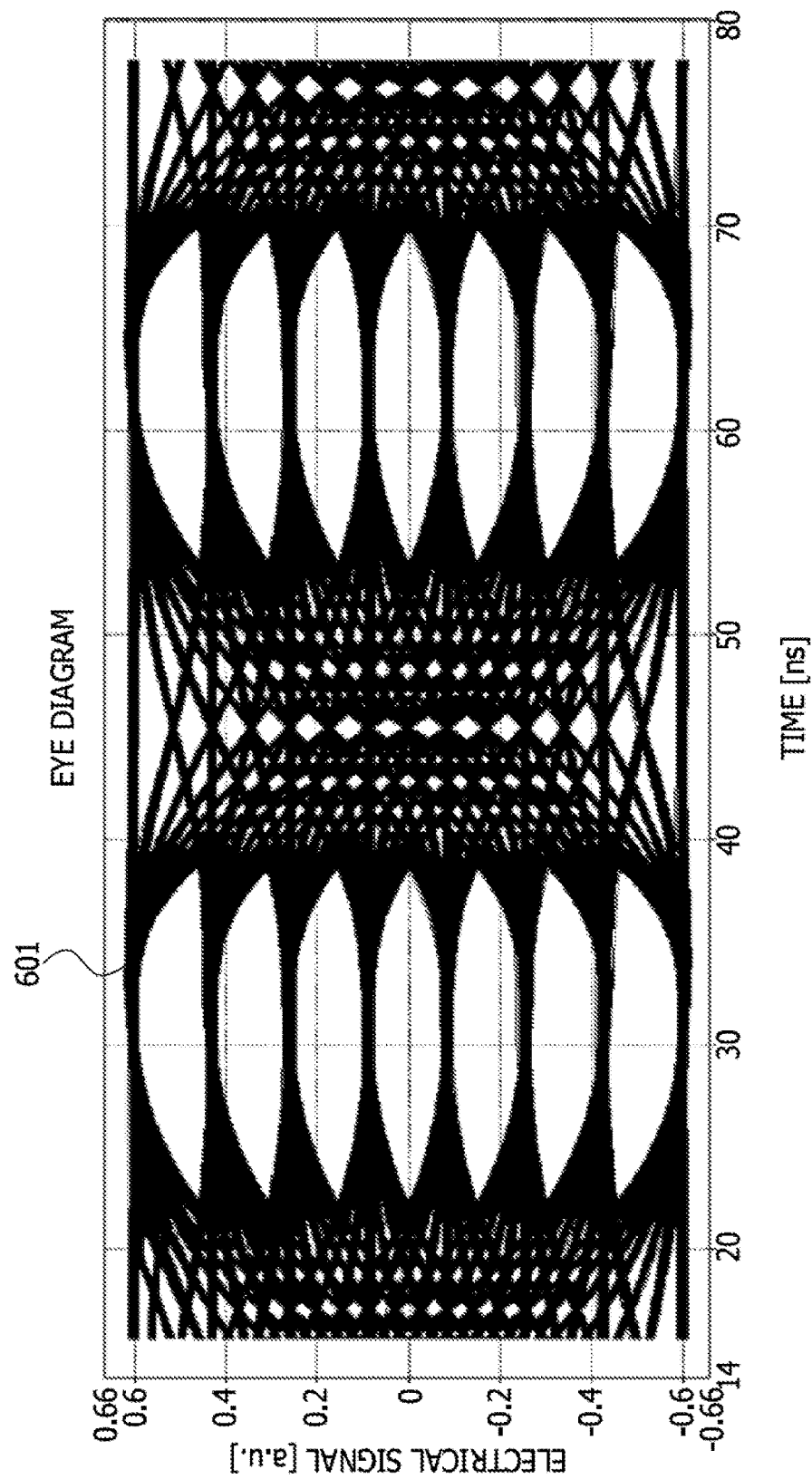
FIG. 6 is a diagram (part 4) illustrating an example of an optical signal received by the optical receiving device according to the embodiment.

Eye diagram 401 illustrated in FIG. 4 is an eye diagram (eye pattern) of the optical receiving device 100 of an optical signal for which the modulation scheme is PAM-2 (NRZ). Eye diagram 501 illustrated in FIG. 5 is an eye diagram in the optical receiving device 100 of an optical signal for which the modulation scheme is PAM-4. Eye diagram 601 illustrated in FIG. 6 is an eye diagram in the optical receiving device 100 of an optical signal in which the modulation scheme is PAM-8.

Histogram of Sampling Result of Optical Signal Received by Optical Receiving Device According to the Embodiment FIG. 7 to FIG. 10 are diagrams illustrating examples of histograms of sampling results of optical signals received by the optical receiving device 100 according to the embodiment. In FIG. 7 to FIG. 10, the horizontal axis denotes intensity [V] and the vertical axis denotes frequency.

Figure 7:
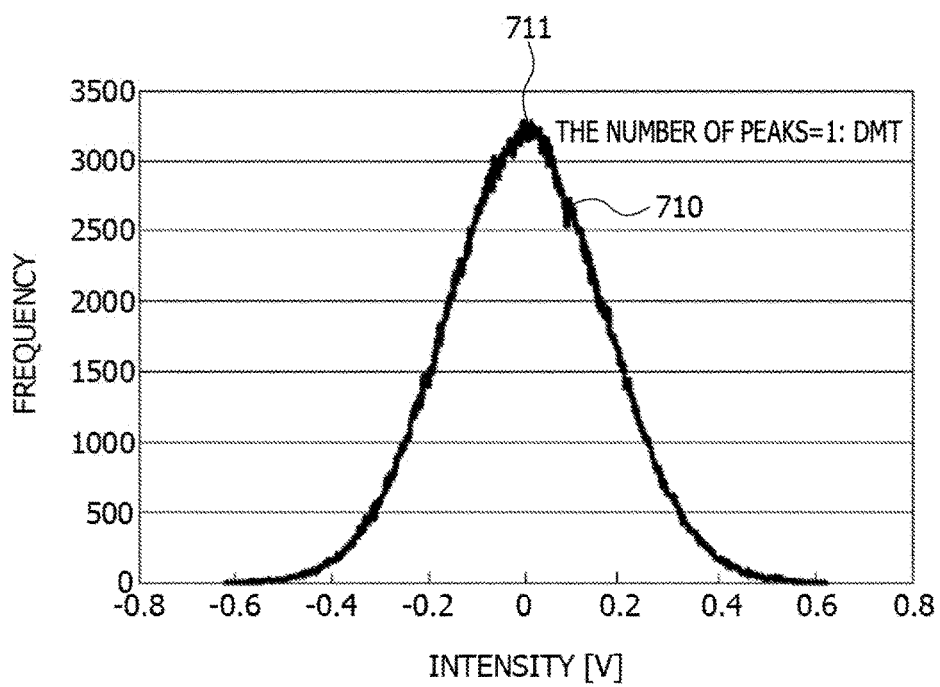
FIG. 7 is a diagram (part 1) illustrating an example of a histogram of a sampling result of an optical signal received by the optical receiving device according to the embodiment.

Histogram 710 illustrated in FIG. 7 denotes a frequency distribution of the intensity of a signal obtained by sampling performed by the ADC 120 when the modulation scheme of an optical signal received by the optical receiving device 100 is DMT. A single peak (peak 711) is displayed in the histogram 710 when the modulation scheme of an optical signal received by the optical receiving device 100 is DMT.

Figure 8:
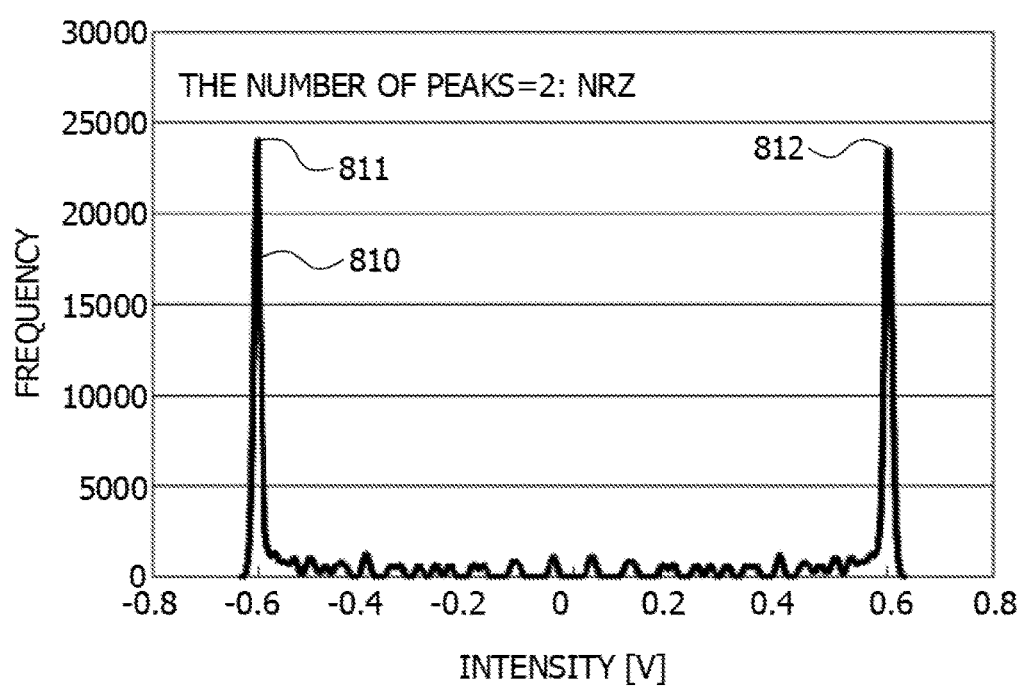
FIG. 8 is a diagram (part 2) illustrating an example of a histogram of a sampling result of an optical signal received by the optical receiving device according to the embodiment.

Histogram 810 illustrated in FIG. 8 denotes a frequency distribution of the intensity of a signal obtained by sampling performed by the ADC 120 when the modulation scheme of an optical signal received by the optical receiving device 100 is PAM-2 (NRZ). Two peaks (peaks 811 and 812) are included in the histogram 810 when the modulation scheme of an optical signal received by the optical receiving device 100 is PAM-2 (NRZ).

Figure 9:
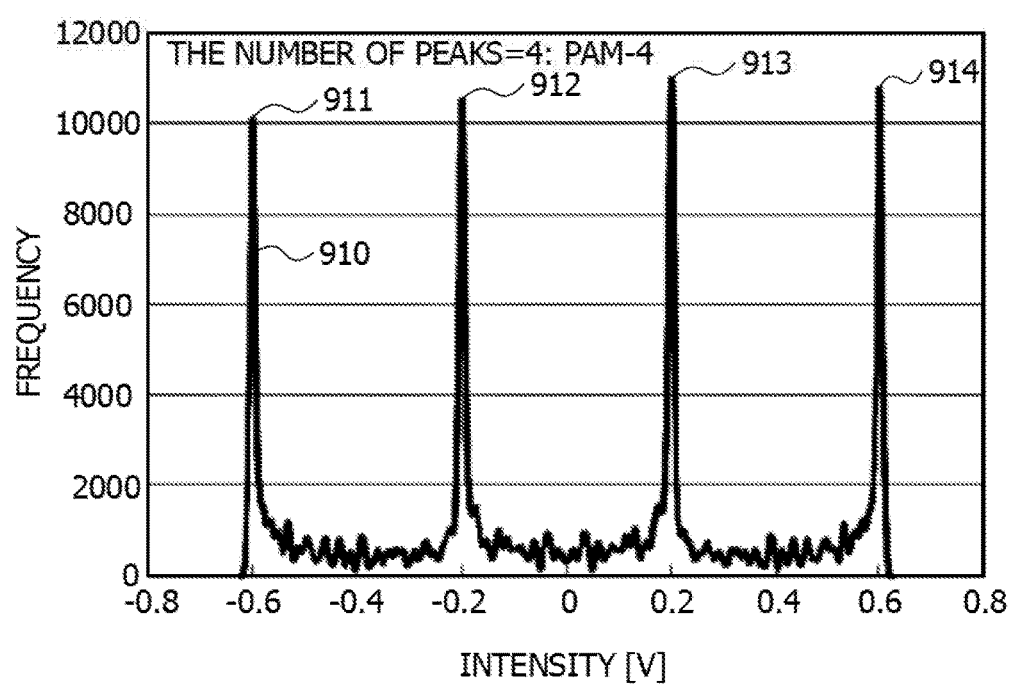
FIG. 9 is a diagram (part 3) illustrating an example of a histogram of a sampling result of an optical signal received by the optical receiving device according to the embodiment.

Histogram 910 illustrated in FIG. 9 denotes a frequency distribution of the intensity of a signal obtained by sampling performed by the ADC 120 when the modulation scheme of an optical signal received by the optical receiving device 100 is PAM-4. Four peaks (peaks 911 to 914) are displayed in the histogram 910 when the modulation scheme of an optical signal received by the optical receiving device 100 is PAM-4.

Figure 10:
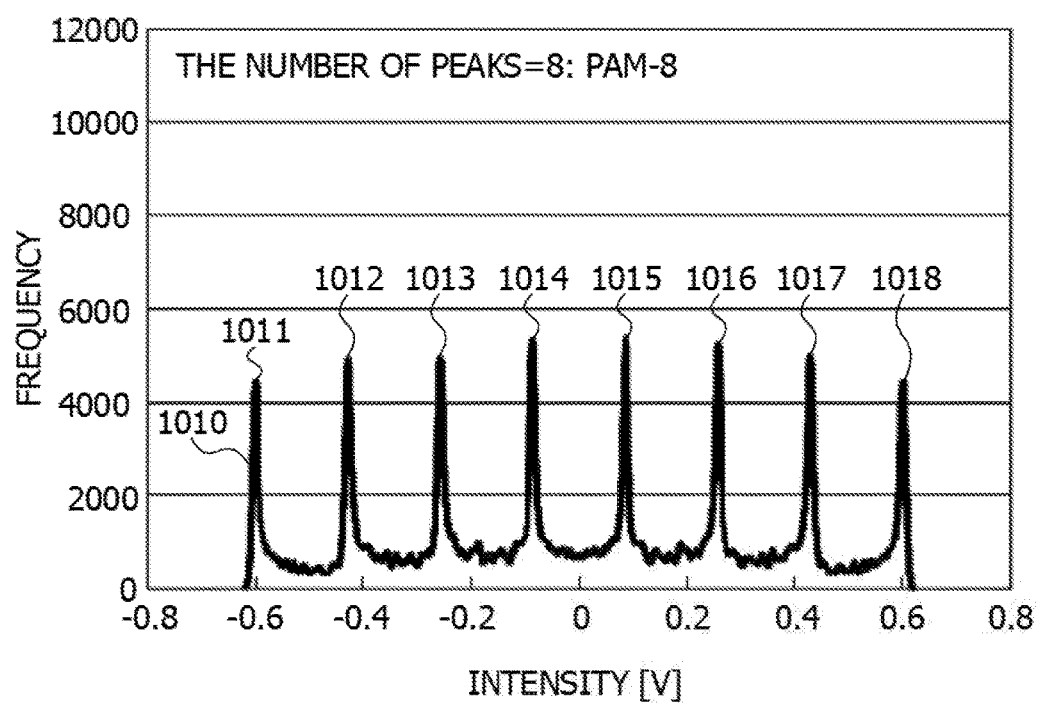
FIG. 10 is a diagram (part 4) illustrating an example of a histogram of a sampling result of an optical signal received by the optical receiving device according to the embodiment.

Histogram 1010 illustrated in FIG. 10 denotes a frequency distribution of the intensity of a signal obtained by sampling performed by the ADC 120 when the modulation scheme of an optical signal received by the optical receiving device 100 is PAM-8. Eight peaks (peaks 1011 to 1018) are displayed in the histogram 1010 when the modulation scheme of an optical signal received by the optical receiving device 100 is PAM-8.

Further, while PAM-2 (NRZ), PAM-4, and PAM-8 have been described with respect to FIG. 8 to FIG. 10, n peaks will be included in a histogram when the modulation scheme of an optical signal received by the optical receiving device 100 is PAM-n (n=2, 4, 8, 16, 32, . . . ).

Figure 11:
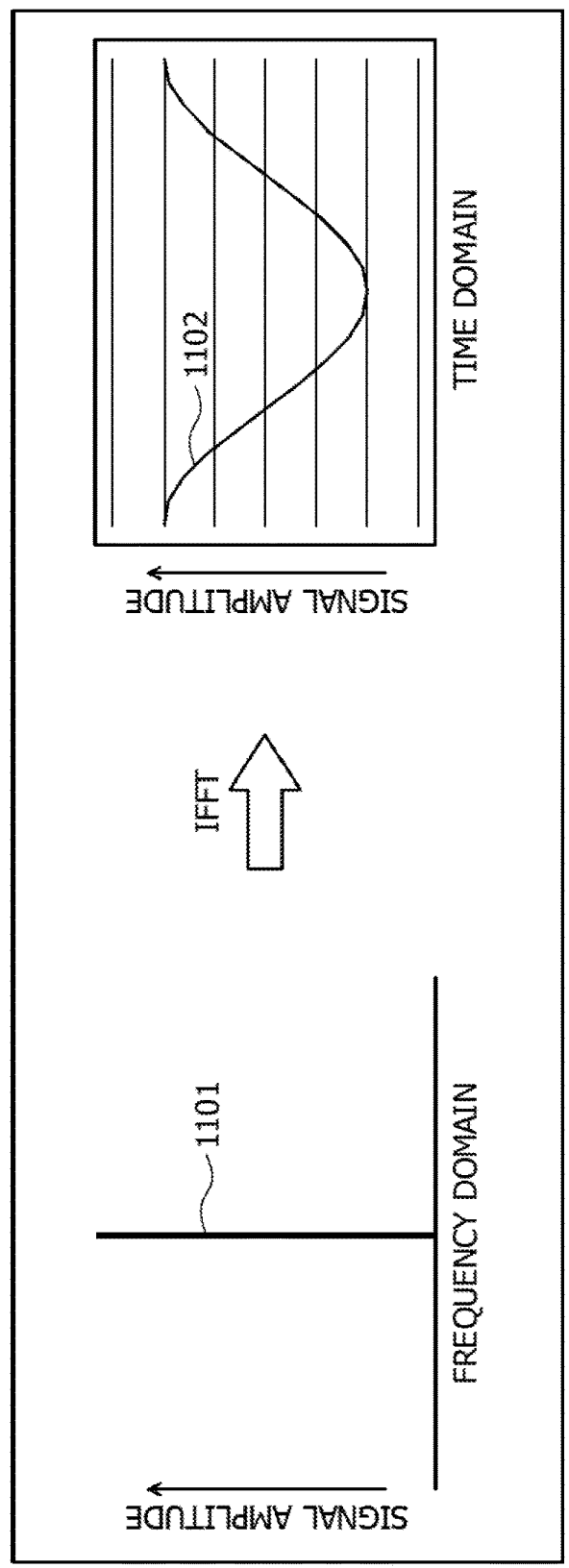
FIG. 11 is a diagram (part 1) illustrating an example of a subcarrier of a DMT optical signal received by the optical receiving device according to the embodiment.
Figure 12:
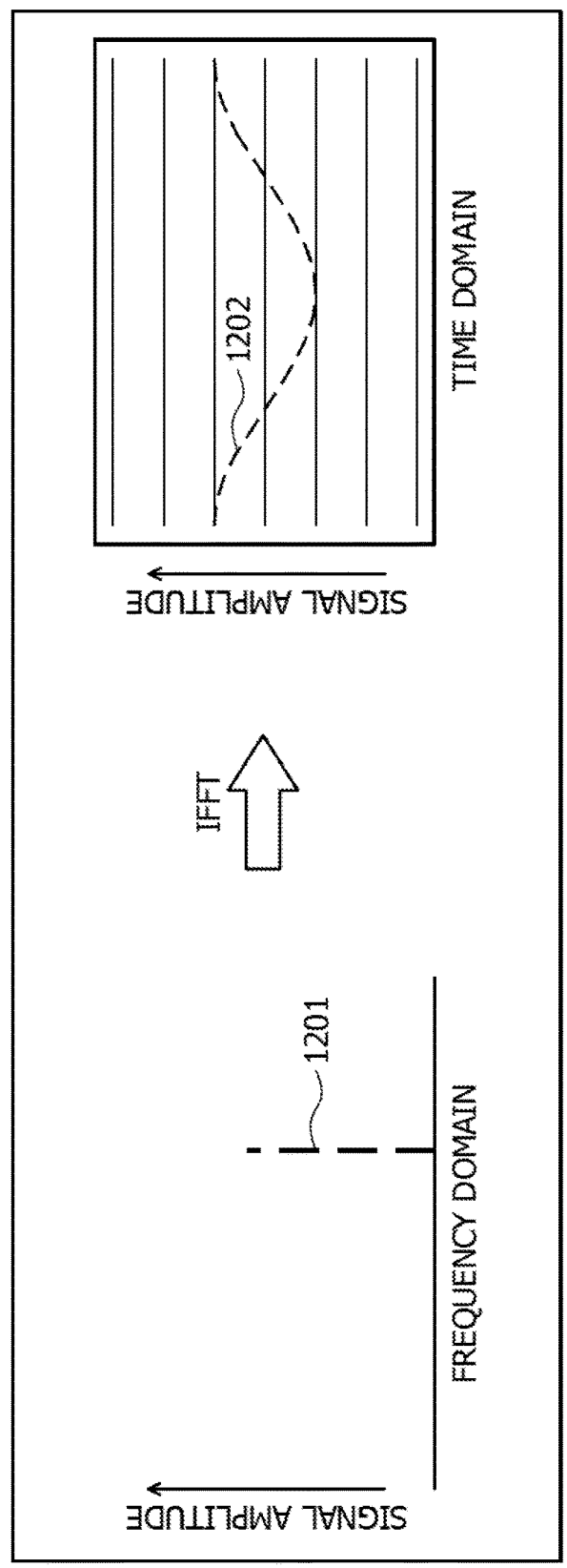
FIG. 12 is a diagram (part 2) illustrating an example of a subcarrier of a DMT optical signal received by the optical receiving device according to the embodiment.
Figure 13:
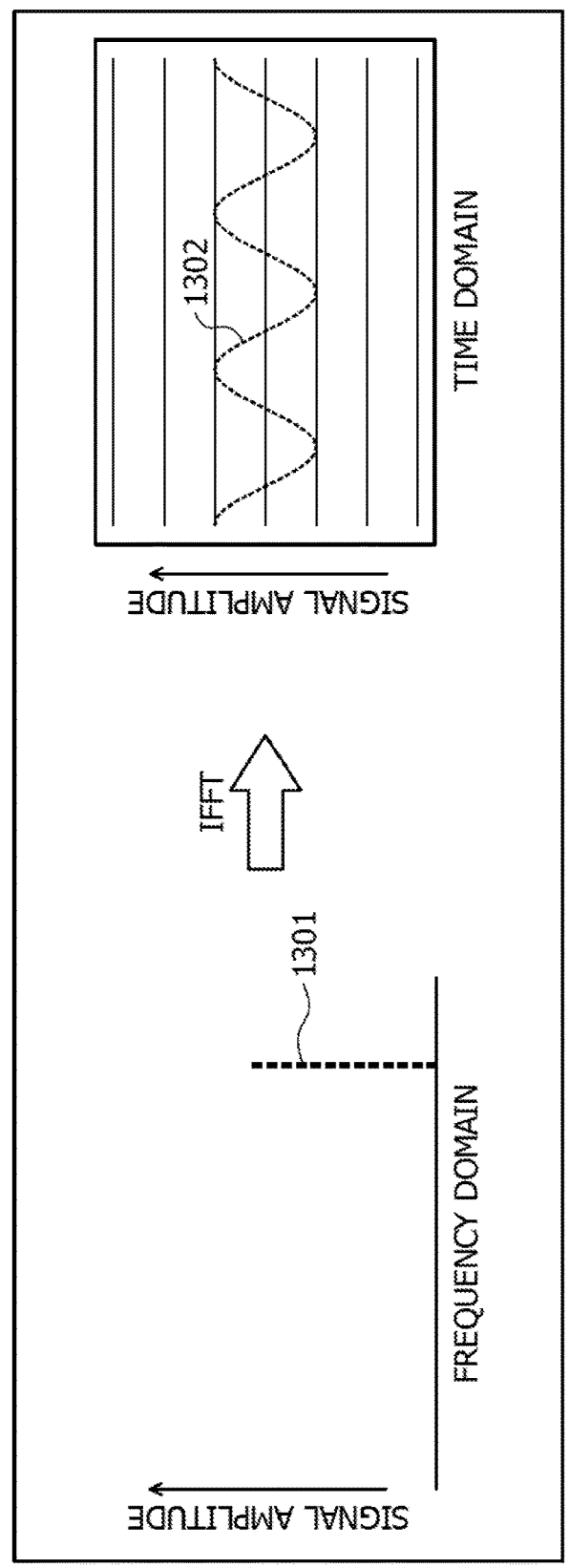
FIG. 13 is a diagram (part 3) illustrating an example of a subcarrier of a DMT optical signal received by the optical receiving device according to the embodiment.

Subcarriers of DMT Optical Signal Received by Optical Receiving Device According to the Embodiment FIG. 11 to FIG. 13 are diagrams illustrating examples of respective subcarriers of DMT optical signals received by the optical receiving device 100 according to the embodiment. Subcarriers 1101, 1201, and 1301 illustrated in FIG. 11 to FIG. 13 are respective subcarriers included in DMT optical signals received by the optical receiving device 100. The subcarriers 1101, 1201, and 1301 are represented as characteristics of the signal amplitude in the frequency domain. The intensities (signal amplitudes) of the subcarriers 1101, 1201, and 1301 may be different from each other due to the effect of frequency intensity characteristics in the optical receiving device 100 or the optical transmission device opposing the optical receiving device 100.

Performing Inverse Fast Fourier Transform (IFFT) on the subcarriers 1101, 1201, and 1301 results in the subcarriers 1102, 1202, and 1302 illustrated in FIG. 11 to FIG. 13, respectively. The subcarriers 1102, 1202, and 1302 are represented as characteristics of the signal amplitude in the time domain.

Figure 14:
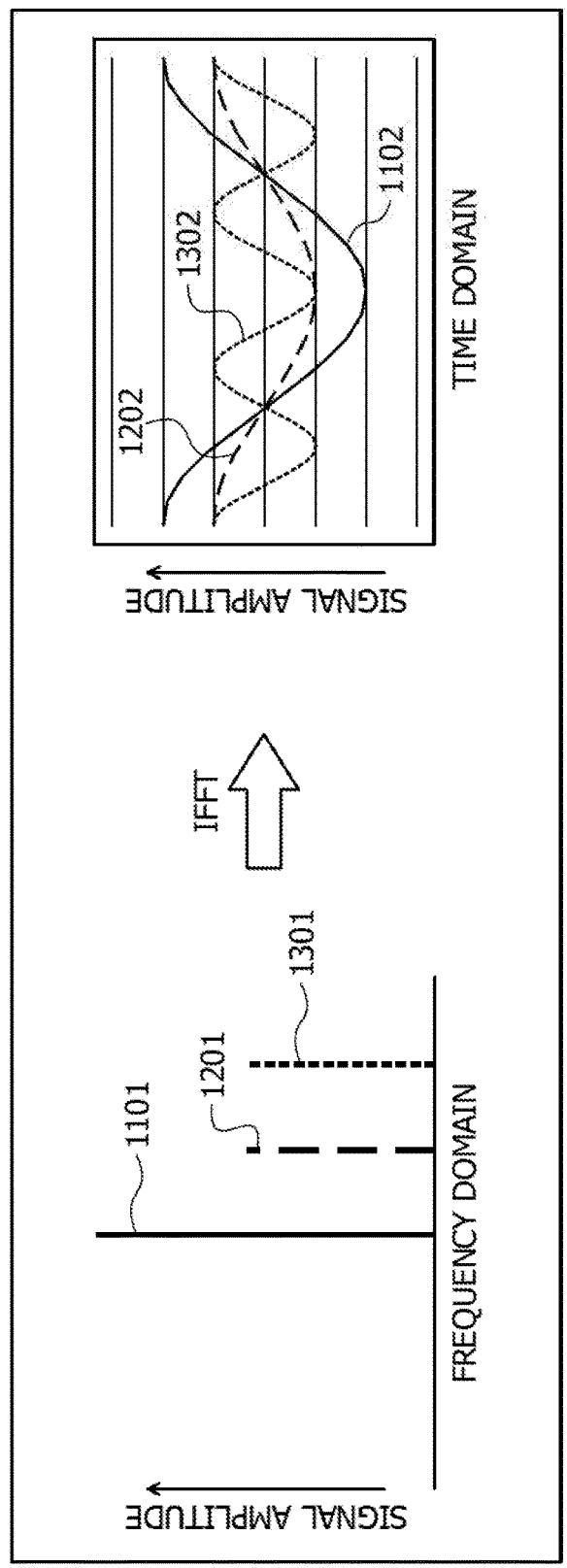
FIG. 14 is a diagram illustrating an example of multiplexing respective subcarriers of DMT optical signals received by the optical receiving device according to the embodiment.

Multiplexing of Subcarriers of Optical Signal of DMT Received by Optical Receiving Device According to the Embodiment FIG. 14 is a diagram illustrating an example of multiplexing of respective subcarriers of a DMT optical signal received by the optical receiving device 100 according to the embodiment. In FIG. 14, the same portions as the portions illustrated in FIG. 11 to FIG. 13 are labeled with the same reference numerals, and description thereof will be omitted. As illustrated in FIG. 14, the subcarriers 1101, 1201, and 1301 of DMT optical signal received by the optical receiving device 100 are multiplexed in the frequency domain. In this case, the intensity of DMT optical signal received by the optical receiving device 100 is the sum of the respective intensities of the subcarriers 1101, 1201, and 1301.

Figure 3:
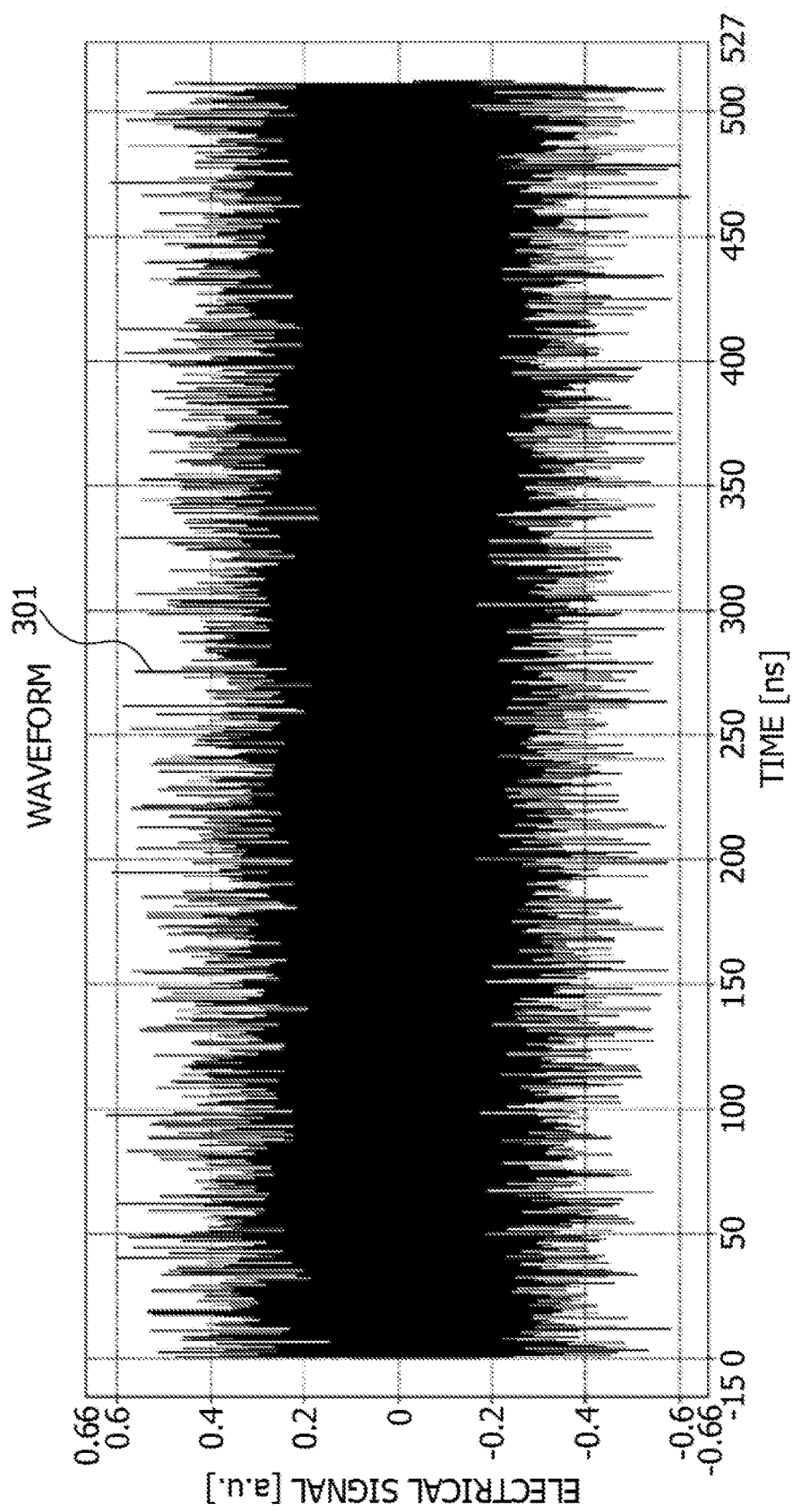
FIG. 3 is a diagram (part 1) illustrating an example of an optical signal received by the optical receiving device according to the embodiment.

The addition of multiple subcarriers including the subcarriers 1101, 1201, and 1301 results in a noise-like addition result as represented by the waveform 301 illustrated in FIG. 3, for example. In this regard, the probability density of the intensities of a DMT optical signal received by the optical receiving device 100 is expressed by equation (1) below, for example. That is, the frequency distribution of the intensities of DMT optical signals received by the optical receiving device 100 is a normal distribution. In equation (1) below, $P(z)=prob\{x(t)=z\}$ represents a probability of the intensity (the amplitude of a sampled electrical signal) of a DMT optical signal received by the optical receiving device 100 becoming z. The term $\sigma x^2$ represents a dispersion of the intensities of a DMT optical signal received by the optical receiving device 100.

$$P(z) = prob\{x(t) = z\} = \frac{1}{\sigma x \sqrt{2\pi}} \exp\left(-\frac{z^2}{2}\right) \sigma x^2 \quad (1)$$

Therefore, even when an intensity difference occurs between subcarriers due to the effect of frequency intensity characteristics in the optical receiving device 100 or the optical transmission device opposing the optical receiving device 100, the sum of the intensities of respective subcarriers is of a normal distribution due to additivity of the normal distribution. Therefore, the frequency distribution of the intensities of a DMT optical signal usually has a single peak. Although a DMT optical signal has been described above, the characteristic that the frequency distribution, which is the sum of the intensities of respective subcarriers, has a single peak applies to optical signals of various modulation schemes using OFDM.

Therefore, when candidates of modulation schemes include a type of OFDM (DMT as an example) and one or more types of PAM, the modulation scheme determination unit 131 can determine the modulation scheme of a received optical signal based on the number of peaks in the frequency distribution of the intensity of the received optical signal.

However, the determination method of the modulation scheme performed by the modulation scheme determination unit 131 is not limited to the determination method based on the number of peaks in a frequency distribution. For example, when the modulation scheme of an optical signal corresponds to DMT as described above, the frequency distribution is close to a normal distribution. Thus, the modulation scheme determination unit 131 may determine whether or not the modulation scheme of an optical signal is DMT by using a goodness-of-fit test that tests a goodness-of-fit between a calculated frequency distribution and a normal distribution.

Figure 15:
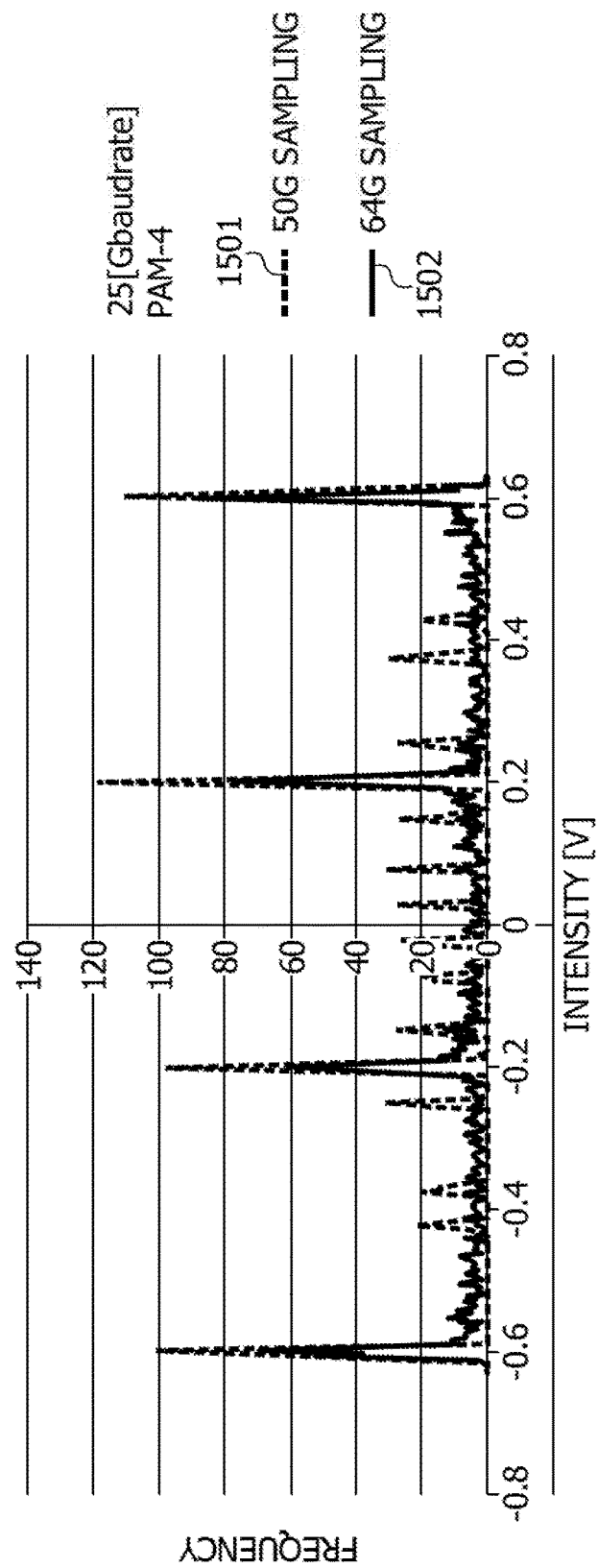
FIG. 15 is a diagram illustrating an example of a histogram of sampling, at respective sampling rates, results of an optical signal received by the optical receiving device according to the embodiment.

Histogram of Sampling Results at Respective Sampling Rates of Optical Signal Received by Optical Receiving Device According to Embodiment FIG. 15 is a diagram illustrating an example of a histogram of sampling, at respective sampling rates, results of an optical signal received by the optical receiving device according to the embodiment. In FIG. 15, the horizontal axis denotes intensity [V], and the vertical axis denotes frequency.

Histogram 1501 denotes a frequency distribution when an optical signal received by the optical receiving device 100 is a PAM-4 optical signal at 25 [G baud rate] and sampling at a sampling rate of 50 [Gs/s] (50G sampling) is performed in the ADC 120. Histogram 1502 denotes a frequency distribution when an optical signal received by the optical receiving device 100 is a PAM-4 optical signal at 25 [G baud rate] and 64G sampling is performed in the ADC 120.

For example, in the histogram 1502, since the peak portion has a frequency around 50 and other portions have a frequency around 5, the peak portion and other portions can be distinguished by the frequency. Therefore, determination of the modulation scheme of an optical signal is possible even with about 500 samples. As an example, let us assume that the number of samples is 10000 for a further margin. In this case, when the sampling rate in the ADC 120 is assumed to be 50 [Gs/s], the sampling time taken for determining the modulation scheme of an optical signal will be 10000/50G=0.2 [μs].

For example, in step S202 illustrated in FIG. 2, the modulation scheme determination unit 131 calculates a frequency distribution by counting a signal from the ADC 120 on an intensity basis over a time period of 0.2 [μs]. Thereby, a frequency distribution having the number of samples that enables determination of the modulation scheme of an optical signal can be obtained.

ADC of Optical Receiving Device According to the Embodiment

Figure 16:
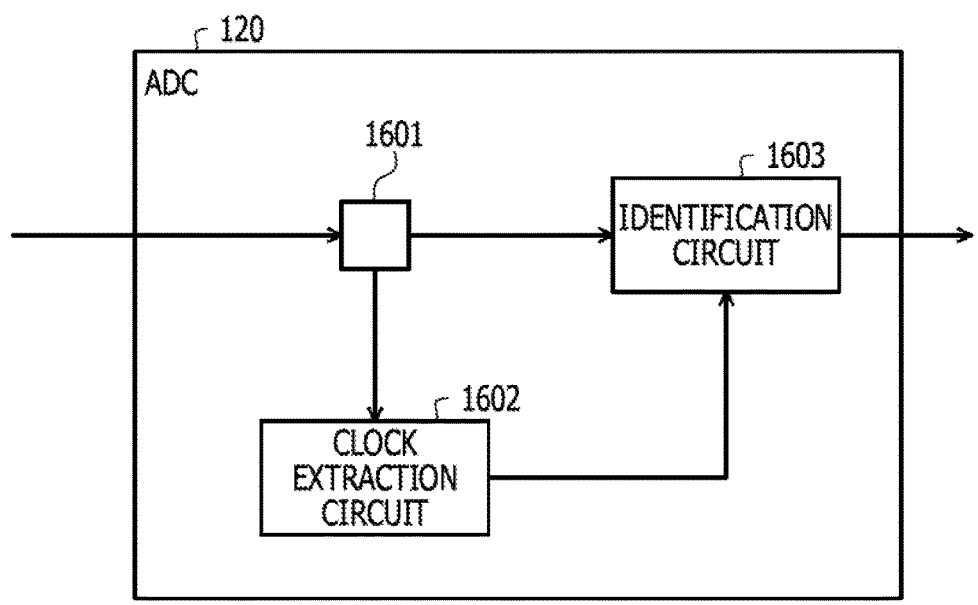
FIG. 16 is a diagram illustrating an example of an ADC of the optical receiving device according to the embodiment.

FIG. 16 is a diagram illustrating an example of the ADC of the optical receiving device 100 according to the embodiment. As illustrated in FIG. 16, the ADC 120 of the optical receiving device 100 has a splitter unit 1601, a clock extraction circuit 1602, and an identification circuit 1603. The splitter unit 1601 splits a signal output from the optical frontend 110 illustrated in FIG. 1 and outputs respective split signals to the clock extraction circuit 1602 and the identification circuit 1603.

The bit rate of a signal output from the optical frontend 110 is denoted as X [Gbps], that is, the baud rate is denoted as X [G baud rate]. The clock extraction circuit 1602 extracts a clock of the signal output from the splitter unit 1601. The clock extraction circuit 1602 then outputs, to the identification circuit 1603 as a sampling clock, a clock of a frequency Y [GHz] that is different from the frequency X [GHz] of the extracted clock.

For example, the clock extraction circuit 1602 frequency-converts the extracted clock and outputs the frequency-converted clock to the identification circuit 1603 as a sampling clock. Alternatively, the clock extraction circuit 160 is able to generate clocks of multiple frequencies and, of the multiple frequencies, outputs a clock of a frequency which is different from the extracted clock frequency to the identification circuit 1603 as a sampling clock.

The identification circuit 1603 identifies the intensity of the signal output from the branch unit 1601 by performing sampling at the sampling clock output from the clock extraction circuit 1602. The identification circuit 1603 then outputs a digital signal indicating an identified value as a signal of a sampling result to the receiving circuit 130 illustrated in FIG. 1.

As illustrated in FIG. 16, the optical receiving device 100 may perform sampling at a sampling rate that is different from the bit rate of a received optical signal in the ADC 120. Thereby, such a situation can be avoided that a sampling rate in the ADC 120 becomes equal to a bit rate of an optical signal and thus a frequency distribution which enables determination of the modulation scheme is not obtained.

Further, by reducing a difference between a bit rate of a received optical signal and a sampling rate, it is possible to suppress degradation of a quality in demodulation of the sampled signal while avoiding a situation where a frequency distribution which enables determination of the modulation scheme is not obtained.

As described above, according to the optical receiving device 100 of the embodiment, it is possible to receive an optical signal by using a direct detection scheme and determine the modulation scheme of the optical signal based on the frequency distribution of the intensity indicated by a digital signal obtained by sampling the intensity of the received signal. This allows for automatically determining the modulation scheme of an optical signal such as DMT, PAM, or the like to demodulate the optical signal, for example.

Further, although the case where the determination device of the present disclosure is applied to the optical receiving device 100 has been described, a determination device which determines the modulation scheme of a received optical signal may be realized by removing the demodulation unit 132 and the decoding unit 133 from the optical receiving device 100, for example. Further, in this case, the difference between a bit rate of an optical signal received in the configuration of FIG. 16 and a sampling rate may be increased.

As described above, according to the optical receiving device and the determination method, the modulation scheme of a received optical signal can be determined.

For example, in recent years, because of diversification of modulation schemes, diversification of requirements of communication services, acceleration of startup of services, diversification of standardizations, or the like, there is a demand for a demand-aware optical transceiver that is able to receive an optical signal by using a plug and play operation. In order to realize a demand-aware optical transceiver, a function of automatically determining the modulation scheme of an input optical signal has to be implemented, for example. For example, in a short range system such as Ethernet (registered trademark), PAM-n (including NRZ) and DMT are proposed and implementation of a function of determining these modulation schemes by a plug and play operation is desired.

To address the above, according to the embodiment described above, it is possible to automatically determine the modulation scheme of an optical signal such as DMT, PAM, or the like at the receiving side and demodulate the optical signal by sampling the intensity of the optical signal received by using a direct detection scheme and using a frequency distribution of the sampled intensities.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical signal receiving device comprising:
    a receiver configured to receive an optical signal on which modulation has been performed by an optical signal transmission device;
    a convertor configured to convert the optical signal received by the receiver to a digital signal by sampling an intensity of the optical signal; and
    a processor coupled to the converter and configured to determine, based on a frequency distribution of the intensity of the optical signal indicated by the digital signal converted by the converter and a number of intensity peaks in the frequency distribution, a modulation scheme of the modulation performed by the optical signal transmission device from among a plurality of modulation schemes including Orthogonal Frequency Division Multiplexing (OFDM) and Pulse Amplitude Modulation (PAM).

2. The optical signal receiving device according to claim 1, wherein the receiver is configured to receive the optical signal by using a direct detection scheme.

3. The optical signal receiving device according to claim 2, wherein
    the receiver is configured to linearly amplify the received optical signal, and
    the convertor is configured to sample the intensity of the linearly amplified optical signal.

4. The optical signal receiving device according to claim 2, wherein
    the convertor is configured to sample the intensity of the optical signal at a sampling rate different from a bit rate of the optical signal.

5. The optical signal receiving device according to claim 1, wherein
    the processor is further configured to demodulate the digital signal based on the determined modulation scheme.

6. The optical signal receiving device according to claim 1, wherein the processor is configured to:
    perform a determination of a goodness-of-fit between the frequency distribution and a normal distribution, and
    determine the modulation scheme of the optical signal based on a result of the determination of the goodness-of-fit.

7. The optical signal receiving device according to claim 1, wherein
    the processor is configured to determine that the modulation scheme is OFDM when the number of intensity peaks is one.

8. The optical signal receiving device according to claim 1, wherein
    the processor is configured to determine that the modulation scheme is PAM when the number of intensity peaks is any one of two, four, and eight.

9. A method of receiving an optical signal using an optical signal receiving device including a receiver, a convertor and a processor coupled to the converter, the method comprising:
    receiving, by the receiver, optical signal on which modulation has been performed by an optical signal transmission device;

converting, by the convertor, the optical signal received by the receiver to a digital signal by sampling an intensity of the optical signal; and determining, by the processor, based on a frequency distribution of the intensity of the optical signal indicated by the digital signal converted by the converter and a number of intensity peaks in the frequency distribution, a modulation scheme of the modulation performed by the optical signal transmission device from among a plurality of modulation schemes including Orthogonal Frequency Division Multiplexing (OFDM) and Pulse Amplitude Modulation (PAM).

10. The method according to claim 9, wherein the receiving is executed using a direct detection scheme.

11. The method according to claim 10, further comprising:

amplifying, by the receiver, the received optical signal in a linear manner, wherein in the converting, the convertor samples the intensity of the linearly amplified optical signal.

12. The method according to claim 10, wherein in the converting, the convertor samples the intensity of the optical signal at a sampling rate different from a bit rate of the optical signal.

13. The method according to claim 9, further comprising:

demodulating, by the processor, the digital signal based on the determined modulation scheme.

14. The method according to claim 9, further comprising:

performing, by the processor, a determination of a goodness-of-fit between the frequency distribution and a normal distribution, wherein the determining is executed based on a result of the determination of the goodness-of-fit.

15. The method according to claim 9, wherein in the determining, the processor determines that the modulation scheme is OFDM when the number of intensity peaks is one.

16. The method according to claim 9, wherein in the determining, the processor determines that the modulation scheme is PAM when the number of intensity peaks is any one of two, four, and eight.

* * * * *